United States Patent
Shepherd

(10) Patent No.: US 11,627,733 B1
(45) Date of Patent: Apr. 18, 2023

(54) FISHING REEL STRINGER

(71) Applicant: Floyd D. Shepherd, Lebanon, TN (US)

(72) Inventor: Floyd D. Shepherd, Lebanon, TN (US)

( * ) Notice: Subject to any disclaimer, the term of this patent is extended or adjusted under 35 U.S.C. 154(b) by 0 days.

(21) Appl. No.: 17/482,598

(22) Filed: Sep. 23, 2021

(51) Int. Cl.
  *A01K 89/01* (2006.01)
  *A01K 89/00* (2006.01)

(52) U.S. Cl.
  CPC .......... *A01K 89/003* (2013.01); *A01K 89/006* (2013.01)

(58) Field of Classification Search
  CPC .. A01K 89/003; A01K 89/006; B65H 54/106; B65H 54/12; B65H 54/44; B65H 54/547; B65H 54/72; B65H 59/04
  See application file for complete search history.

(56) References Cited

U.S. PATENT DOCUMENTS

| | | | | |
|---|---|---|---|---|
| 2,373,958 | A * | 4/1945 | Hornstein | B65H 54/18 87/58 |
| 2,848,778 | A * | 8/1958 | Plummer, Sr. | A01K 89/003 43/25 |
| 2,903,196 | A * | 9/1959 | Fowler | A01K 89/003 242/395 |
| 3,042,329 | A * | 7/1962 | Signorella | A61B 17/06195 242/118 |
| 3,647,155 | A * | 3/1972 | Jorgenson | A01K 89/003 242/900 |
| 3,704,840 | A | 12/1972 | Haddock | |
| 3,951,354 | A * | 4/1976 | Bagby | A01K 89/003 242/470 |
| 4,007,886 | A | 2/1977 | Kaminstein | |
| 4,588,139 | A | 5/1986 | Lines | |
| 5,163,632 | A * | 11/1992 | Chilcoat | B65H 75/143 242/486.9 |
| 5,725,172 | A | 3/1998 | Koehler et al. | |
| 5,906,329 | A | 5/1999 | Wesley, Sr. | |
| 6,254,029 | B1 * | 7/2001 | Robertson | B65H 54/106 242/487 |
| 6,260,785 | B1 | 7/2001 | Prais | |
| 6,651,921 | B1 * | 11/2003 | Travis | B65H 54/106 242/597.5 |
| 9,693,545 | B1 * | 7/2017 | McIntyre | A01K 89/003 |
| 10,660,321 | B2 | 5/2020 | Tseng | |
| 2012/0085855 | A1 * | 4/2012 | Mitchell | A01D 34/4166 242/476.7 |
| 2018/0116193 | A1 * | 5/2018 | Rogers | A01K 89/003 |

FOREIGN PATENT DOCUMENTS

| | | | | |
|---|---|---|---|---|
| CA | | 2475158 A1 * | 1/2006 | A01K 89/003 |
| WO | WO-9309667 A1 * | | 5/1993 | A01K 89/003 |

* cited by examiner

*Primary Examiner* — Emmanuel M Marcelo

(74) *Attorney, Agent, or Firm* — Cramer Patent & Design, PLLC; Aaron R. Cramer

(57) ABSTRACT

The reel stringer may comprise a spool retainer, one or more eyelets, a reel holder, a housing, and a line cutter. The reel stringer may be operable to hold a new line spool and a reel such that fishing line may be wound onto a reel spool from the new line spool by turning a crank handle on the reel. The reel may removably couple to the reel holder for stringing. The spool retainer may hold the new line spool such that the new line spool may rotate as the fishing line is used. The fishing line may feed from the new line spool, through the one or more eyelets, and onto the reel. A first storage section may be used to store spools of string and other supplies. An alternative embodiment may provide a second storage area.

18 Claims, 7 Drawing Sheets

FISHING REEL STRINGER

RELATED APPLICATIONS

Non-applicable.

FIELD OF THE INVENTION

The present invention relates generally to a fishing reel stringer device.

BACKGROUND OF THE INVENTION

The technology used by anglers to catch fish has become increasingly complex in nature. Fishermen no longer rely on the traditional hook and worm approach to attract their game. Instead, a broad range of products have hit the market, designed to aid the fisherman to catch more fish quickly. As would be suspected, the fishing rod is still a very important part of fishing, And, as with most mechanical things, it is prone to wearing out and failing, especially the fishing line.

When a line requires replacement, it is typically a two-person operation, one to hold the reel of new line, and one to wind it up on the new reel. Even so, the reel of new line is prone to slipping and misalignment. It is also difficult to keep the proper tensions. Should the user attempt to perform the operation by themselves, the line is usually taken off of the side of the new reel thus imparting a twist to the line, leading to unsatisfactory performance of the fishing reel and rod set. Accordingly, there exists a need for a means by which a new fishing line can be easily transferred to an empty fishing rod reel without the problems as described above. The development of the reel stringer fulfills this need.

SUMMARY OF THE INVENTION

To achieve the above and other objectives, the present invention provides for a reel stringer that has, a spool retainer having a shaft, one or more flat washers, one or more springs, and a fastener, one or more eyelets coupled to the housing between a reel and the spool retainer, a fishing line routed through the one or more eyelets in order to guide the fishing line and to apply tension to the fishing line, a reel holder having a partial rod that couples to an end of the housing that is opposite the spool retainer, a housing having a stringer section and a first storage section, a spool compartment storing one or more spare spools, and a line cutter having a cutting device mounted to the housing, wherein the reel stringer is adapted to hold a new line spool and the reel such that the fishing line is wound onto a reel spool from the new line spool by turning a crank handle on the reel. The reel holder includes a reel seat and a rod handle. The stringer section houses the spool retainer and the one or more eyelets.

The spool retainer may hold the new line spool in position within the housing while the fishing line is moved from the new line spool to the reel spool. The spool retainer may permit the new line spool to rotate as the fishing line is pulled by the reel but may prevent the new line spool from free-spinning to prevent the fishing line from tangling. The shaft may be coupled to the housing. The shaft may be at least partially threaded at an outside end of the shaft such that the fastener is removably coupled to the shaft. The shaft may be replaceable and available in a plurality of lengths to accommodate a supply spool of a plurality of sizes. The one or more flat washers may press against one or both sides of the new line spool. The one or more flat washers may reduce friction between the new line spool and the housing and/or between the new line spool and the one or more springs. The one or more springs may press against the sides of the new line spool either directly or indirectly via the one or more flat washers such that the new line spool is prevented from free-spinning. The one or more springs may be located between the new line spool and the fastener, between the new line spool, and the housing, or both. The fastener may be removably coupled to an outside end of the shaft to prevent the new line spool, the one or more flat washers, and the one or more springs from falling off of the shaft. The reel may be removably coupled to the reel holder to hold the reel in a position where the reel is cranked to draw the fishing line from the new line spool onto the reel spool. The reel seat may mate with a reel foot of the reel in order to hold the reel to the reel holder. The reel holder may be detachable from the housing.

The stringer section may be disposed in front of the housing. The stringer section may house the spool retainer and the one or more eyelets. The housing may be made of a material selected from the group consisting of plastic, wood, aluminum, one or more composite resins, or an injection molded plastic. The first storage section may be disposed behind the housing. The first storage section may include a foam insert with a plurality of cutouts for storing one or more accessories. The housing may include a front cover for covering the stringer section, a rear cover for covering the first storage section, or both.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
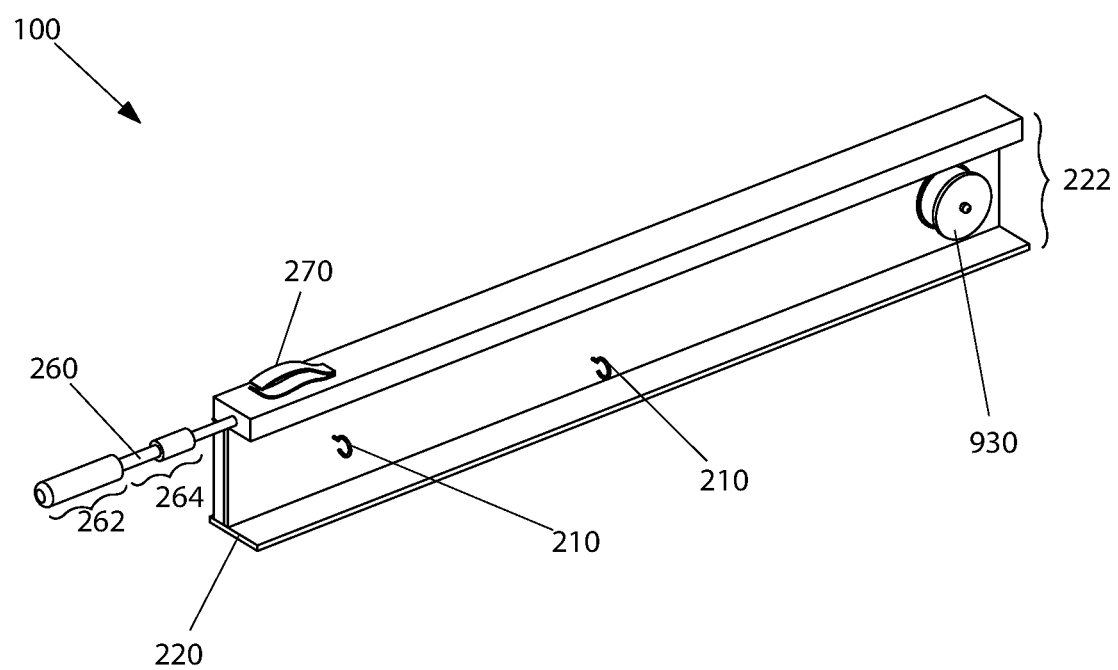
FIG. 1 is an isometric view of a reel stringer, according to an embodiment of the present invention.
Figure 2:
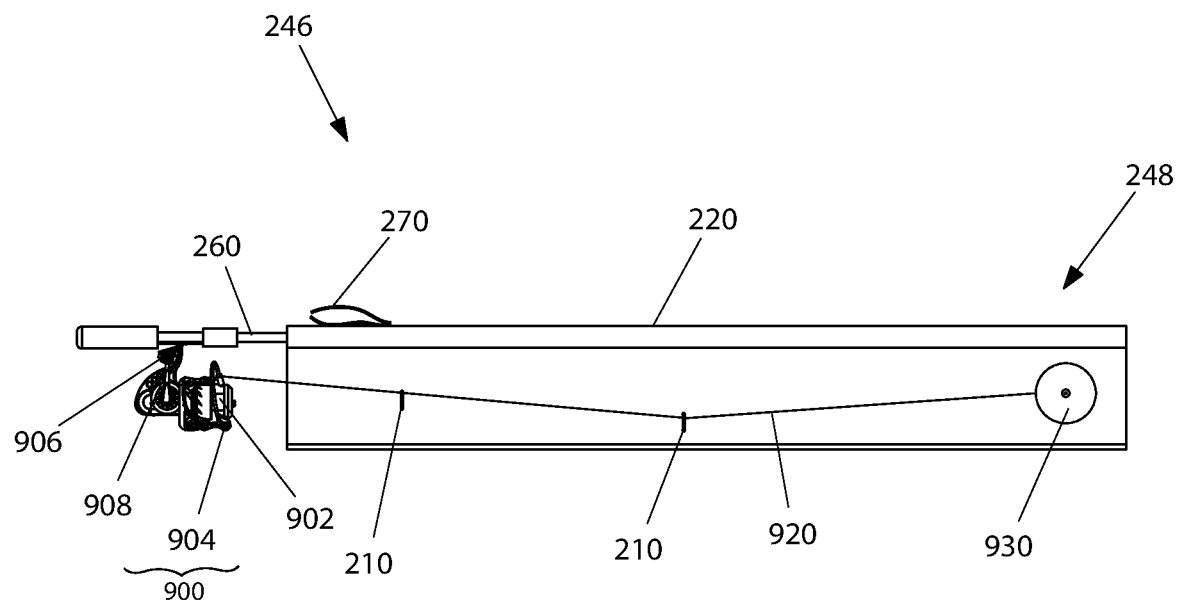
FIG. 2 is a front view of a reel stringer, according to an embodiment of the present invention illustrating the reel in place on the reel holder.
Figure 3:
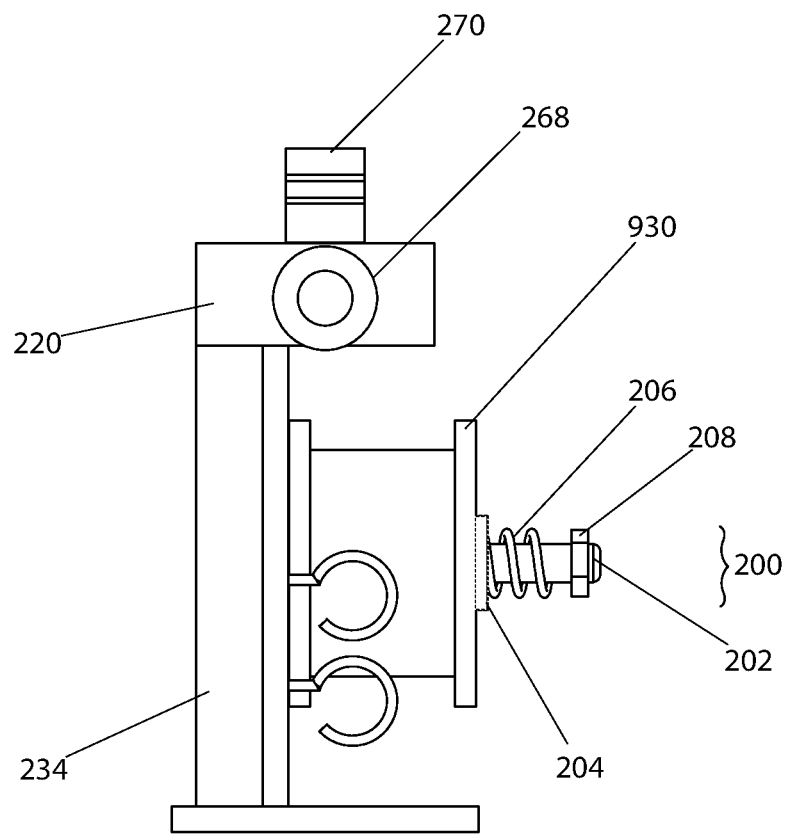
FIG. 3 is a side view of a reel stringer with the reel holder detached, according to an embodiment of the present invention.
Figure 4:
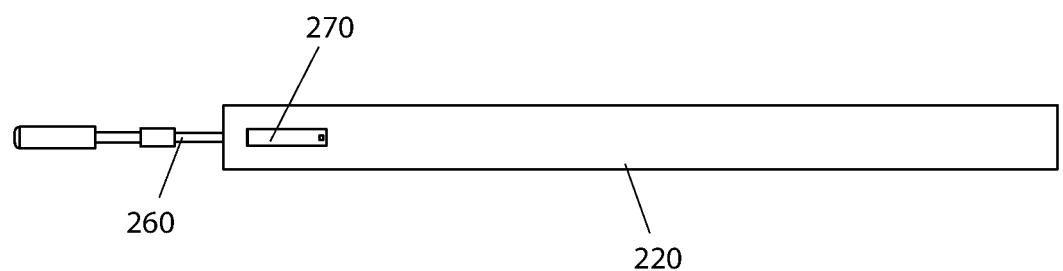
FIG. 4 is a top view of a reel stringer, according to an embodiment of the present invention.
Figure 5:
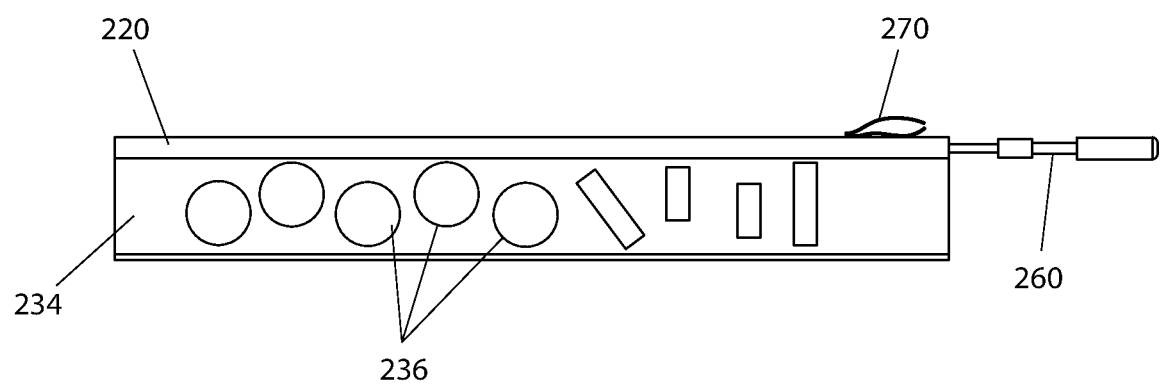
FIG. 5 is a rear view of a reel stringer, according to an embodiment of the present invention.
Figure 6:
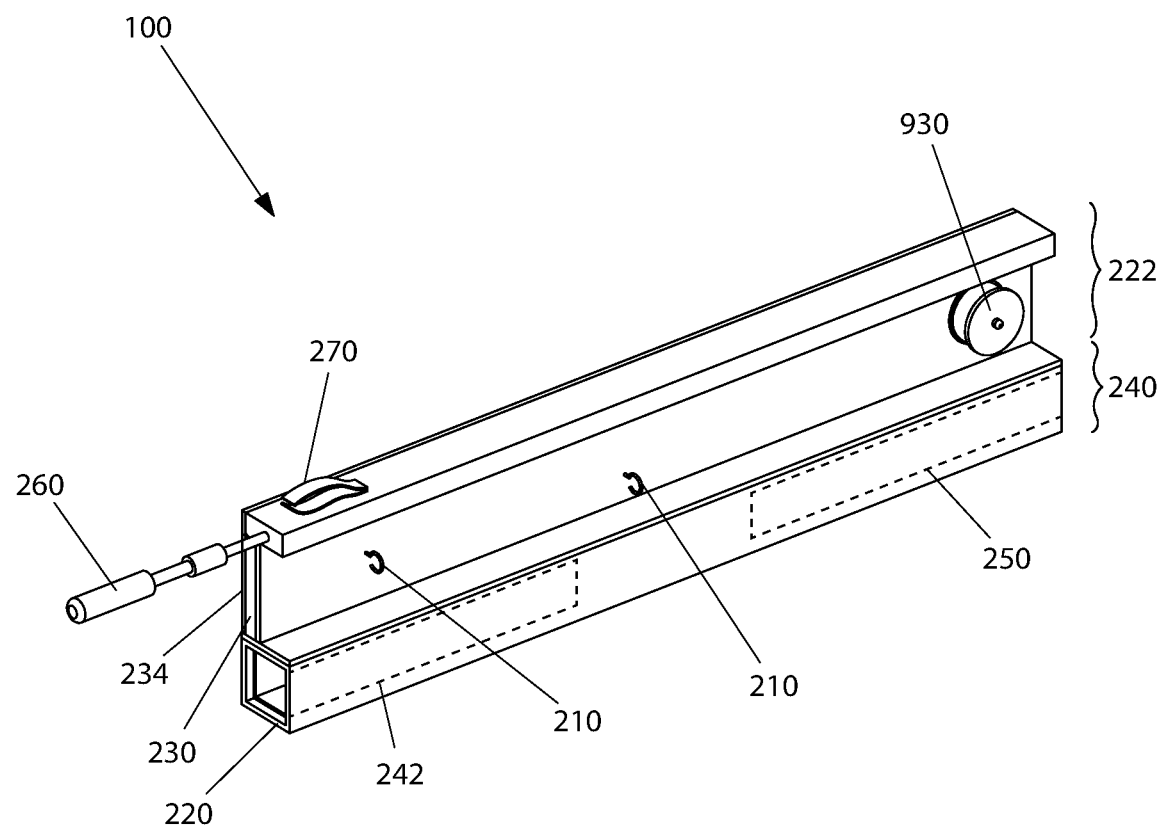
FIG. 6 is a front isometric view of a reel stringer, according to an alternative embodiment of the present invention.
Figure 7:
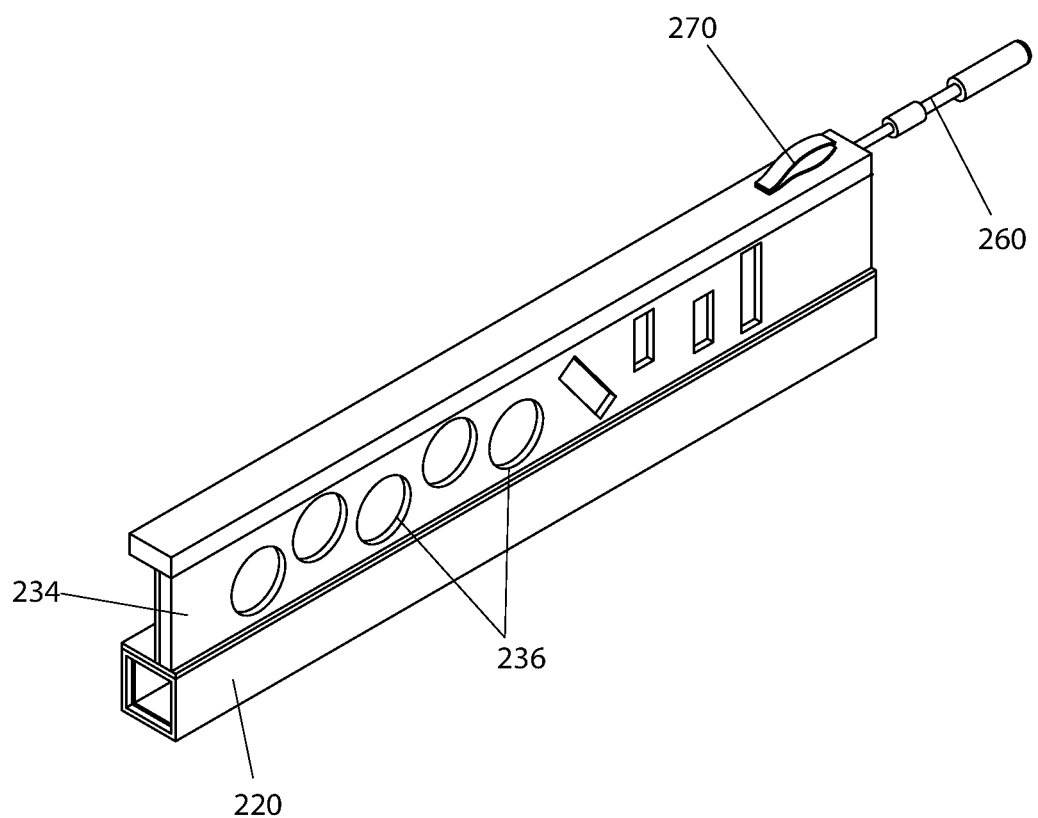
FIG. 7 is a rear isometric view of a reel stringer, according to an alternative embodiment of the present invention.
Figure 8:
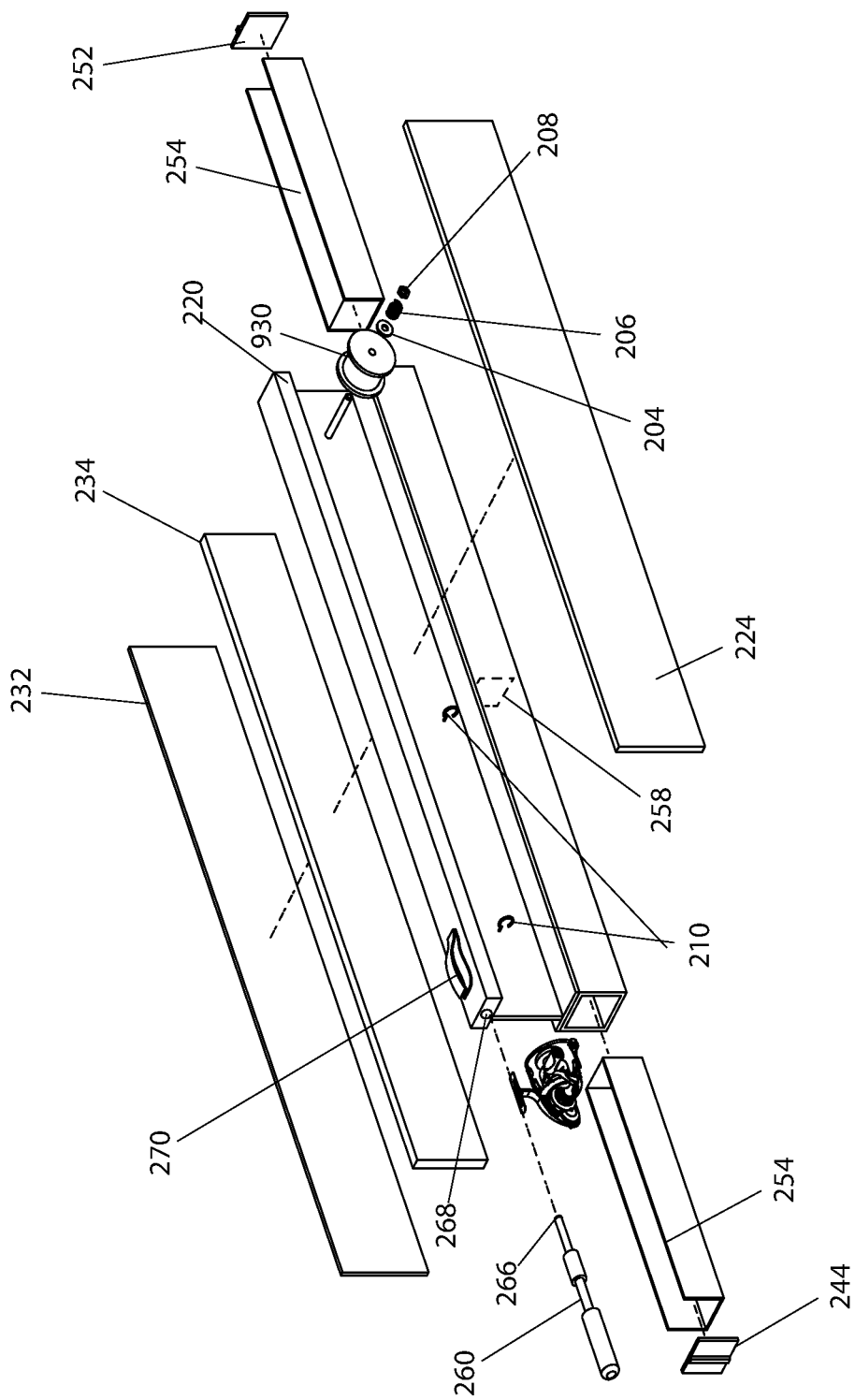
FIG. 8 is an exploded view of a reel stringer, according to an alternative embodiment of the present invention.

DESCRIPTIVE KEY 100 reel stringer
200 spool retainer
202 shaft
204 flat washer
206 spring
208 fastener
210 eyelet
220 housing
222 stringer section 224 front cover
230 first storage section
232 rear cover
234 foam insert
236 plurality of cutouts
240 second storage section
242 rod compartment
244 rod holder end cap
246 first end
248 second end
250 spool compartment
252 spool holder end cap
254 tray
258 internal divider
260 reel holder
262 rod handle
264 reel seat
266 first threaded coupler
268 second threaded coupler
270 line cutter
900 reel
902 reel spool
904 bail arm
906 reel foot
908 crank handle
920 fishing line
930 new line spool

DESCRIPTION OF THE INVENTION

The present invention is directed to a reel stringer (herein described as the "invention") 100. The invention 100 may comprise a spool retainer 200, one (1) or more eyelets 210, a reel holder 260, a housing 220, and a line cutter 270. The invention 100 may be operable to hold a new line spool 930 and a reel 900 such that fishing line 920 may be wound onto a reel spool 902 from the new line spool 930 by simply turning a crank handle 908 on the reel 900. The process of winding the fishing line 920 onto the reel 900 may be referred to as stringing the reel 900. The reel 900 may removably couple to the reel holder 260 for stringing. The spool retainer 200 may hold the new line spool 930 such that the new line spool 930 may rotate as the fishing line 920 is used. The fishing line 920 may feed from the new line spool 930, through the one (1) or more eyelets 210, and onto the reel 900. The one (1) or more eyelets 210 may guide the fishing line 920 and may provide tension to the fishing line 920. The spool retainer 200, the one (1) or more eyelets 210, and the reel holder 260 may be mounted on the housing 220.

The spool retainer 200 may comprise a shaft 202, one (1) or more flat washers 204, one (1) or more springs 206, and a fastener 208. The spool retainer 200 may hold the new line spool 930 in position within the housing 220 while the fishing line 920 is moved from the new line spool 930 to the reel spool 902. The spool retainer 200 may permit the new line spool 930 to rotate as the fishing line 920 is pulled by the reel 900 but may prevent the new line spool 930 from free-spinning. Free-spinning of the new line spool 930 may be undesirable because if the new line spool 930 free-spins then the fishing line 920 may become slack and may tangle.

The shaft 202 may be operable as an axle for the new line spool 930 to rotate around. An inside end of the shaft 202 may be coupled to the housing 220. The shaft 202 may be at least partially threaded at an outside end of the shaft 202 such that the fastener 208 may removably couple to the shaft 202.

In some embodiments, the shaft 202 may be replaceable and available in multiple lengths to accommodate supply spools of differing sizes.

The one or more flat washers 204 may press against one (1) or both sides of the new line spool 930. As non-limiting examples, the one (1) or more flat washers 204 may reduce friction between the new line spool 930 and the housing 220 and/or between the new line spool 930 and the one (1) or more springs 206.

The one (1) or more springs 206 may press against the sides of the new line spool 930 either directly or indirectly via the one (1) or more flat washers 204 such that the new line spool 930 is prevented from free-spinning. The one (1) or more springs 206 may be located between the new line spool 930 and the fastener 208, between the new line spool 930 and the housing 220, or both.

The fastener 208 may removably couple to the outside end of the shaft 202 to prevent the new line spool 930, the one or more flat washers 204, and the one (1) or more springs 206 from falling off of the shaft 202. In some embodiments, the fastener 208 may be a wing nut.

The one (1) or more eyelets 210 may be coupled to the housing 220 between the reel 900 and the spool retainer 200. The fishing line 920 may be routed through the one or more eyelets 210 in order to guide the fishing line 920 and to apply tension to the fishing line 920.

The reel holder 260 may be a partial rod that may couple to an end of the housing 220 that is opposite the spool retainer 200. The reel 900 may be removably coupled to the reel holder 260 to hold the reel 900 in a position where the reel 900 may be cranked to draw the fishing line 920 from the new line spool 930 onto the reel spool 902. The reel holder 260 may comprise a reel seat 264 and a rod handle 262. The reel seat 264 may be operable to mate with a reel foot 906 of the reel 900 in order to hold the reel 900 to the reel holder 260. The rod handle 262 may be adapted for a user to grasp while cranking the reel 900.

In some embodiments, the reel holder 260 may be detachable from the housing 220. As a non-limiting example, a first threaded coupler 266 located on the distal end of the reel holder 260 may threadably couple to a second threaded coupler 268 located on the housing 220 to hold the reel holder 260 onto the housing 220. The first threaded coupler 266 may threadably decouple from the second threaded coupler 268 when the reel holder 260 is not being used.

The housing 220 may provide structural support and storage areas. As non-limiting examples, the housing 220 may be made of plastic, wood, aluminum, composite resins, or combinations thereof. In a preferred embodiment, the housing 220 may be made of injection molded plastic.

The housing 220 may comprise a stringer section 222. The stringer section 222 may be located on the front of the housing 220. The stringer section 222 may house the spool retainer 200 and the one (1) or more eyelets 210. The housing 220 may comprise a first storage section 230. The first storage section 230 may be located on the rear of the housing 220. The first storage section 230 may comprise a foam insert 234 with a plurality of cutouts 236 for storing accessories. As non-limiting examples, that accessories may comprise spools of fishing line, reel lubricant, a package of rubber bands, spare hardware, or combinations thereof.

In some embodiments, the housing 220 may comprise a front cover 224 for covering the stringer section 222, a rear cover 232 for covering the first storage section 230, or both. As non-limiting examples, the front cover 224 and/or the rear cover 232 may couple to the housing 220 via one (1) or more hinges, may slide on track grooves, may couple using screws, or combinations thereof.

In some embodiments, the housing 220 may further comprise a second storage section 240. The second storage section 240 may be located beneath the stringer section 222 and the first storage section 230 and may provide additional storage areas. The second storage section 240 may comprise a rod compartment 242, a spool compartment 250, and an internal divider 258.

The rod compartment 242 may be operable to store the reel holder 260 when the reel holder 260 is detached from the housing 220. Access to the rod compartment 242 may be through a first end 246 of the second storage section 240. The spool compartment 250 may be operable to store one (1) or more spare spools. The spool compartment 250 may be located on the end of the second storage section 240 that is opposite the rod compartment 242. Access to the spool compartment 250 may be through a second end 248 of the second storage section 240. The spool compartment 250 may store the one (1) or more spare spools that are aligned flat-end to flat-end. The one (1) or more spare spools may be of varied capacities. As a non-limiting example, a first stored spool having a width of one inch (1 in.) and a capacity of three hundred yards (300 yds.) of line may be stored within the spool compartment 250 adjacent to a second stored spool having a width of two inches (2 in.) and a capacity of six hundred yards (600 yds.) of line. In some embodiments, the reel holder 260 and/or the one (1) or more spare spools may be placed into one (1) or more trays 254 that slide into the rod compartment 242 and/or the spool compartment 250.

In some embodiments, the end of the rod compartment 242 and the end of the spool compartment 250 may be sealed with a rod holder end cap 244 and a spool holder end cap 252, respectively, to prevent the reel holder 260 and the one (1) or more spare spools from sliding out of the second storage section 240. As non-limiting examples, the rod holder end cap 244 and the spool holder end cap 252 may be a hinged or sliding doors. Alternatively, the rod holder end cap 244 and the spool holder end cap 252 may be plugs sized to friction fit into the ends of the rod compartment 242 and the spool compartment 250. The rod holder end cap 244 and the spool holder end cap 252 may each comprise an end cap handle to aid in insertion and removal.

The internal divider 258 may be a center wall that divides the second storage section 240 into the rod compartment 242 and the spool compartment 250. The internal divider 258 may be oriented perpendicular to the outer walls of the second storage section 240. The internal divider 258 may be laterally positioned within the second storage section 240 such that the reel holder 260 may fit completely within the rod compartment 242.

The line cutter 270 may be a cutting device mounted to the housing 220. The line cutter 270 may be operable to cut the fishing line 920 between the reel spool 902 and the new line spool 930 so that the reel 900 may be removed from the reel holder 260 and/or so that the new line spool 930 may be removed from the spool retainer 200.

To use the invention 100:
Place the invention 100 on a countertop, table, or flat workspace.
Remove the reel holder 260 from the rod compartment 242 and install the reel holder 260 on the end of the housing 220.
Install the reel 900 needing new line on the reel holder 260 after removing old fishing line from the reel 900.
Place the new line spool 930 on the spool retainer 200. Secure the new line spool 930 using the one (1) or more flat washers 204, the one (1) or more springs 206, and the fastener 208.
Feed the fishing line 920 through all of the one (1) or more eyelets 210 moving right to left (i.e., starting closest to the spool retainer 200 and moving towards the reel 930).
Open the bail arm 904 on the reel 900. Feed the fishing line 920 through the string counter on the reel 900 (if applicable) and then tie the fishing line 920 to the reel 900 using a desired knot choice.
Set the string counter to zero (0) (if applicable) and turn the crank handle 908 on the reel 900 to draw the fishing line 920 onto the reel spool 902. Adjusting the tension spring on the reel 900 to a desired feel while cranking.
When the reel spool 902 reaches a desired capacity, cut the fishing line 920 using the line cutter 270.
Secure the fishing line 920 on the reel spool 902 using a rubber band and remove the reel 900 from the reel holder 260.
Secure the fishing line 920 on the new line spool 930 using an additional rubber band and remove the new line spool 930 from the spool retainer 200.

The steps shown above may be repeated for another reel if applicable.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A reel stringer, comprising:
a spool retainer having a shaft, one or more flat washers, one or more springs, and a fastener;
one or more eyelets coupled to a housing between a reel and the spool retainer; a fishing line routed through the one or more eyelets in order to guide the fishing line and to apply tension to the fishing line;
a reel holder having a partial rod that couples to an end of the housing that is opposite the spool retainer, the reel holder includes a reel seat and a rod handle;
a housing having a stringer section and a first storage section, the stringer section houses the spool retainer and the one or more eyelets;
a spool compartment storing one or more spare spools; and
a line cutter having a cutting device mounted to the housing;
wherein the reel stringer is adapted to hold a new line spool and the reel such that the fishing line is wound onto a reel spool from the new line spool by turning a crank handle on the reel;
wherein the first storage section includes a foam insert with a plurality of cutouts for storing one or more accessories; and,
wherein the housing includes a front cover for covering the stringer section, a rear cover for covering the first storage section, or both.

2. The reel stringer, according to claim 1, wherein the spool retainer holds the new line spool in position within the housing while the fishing line is moved from the new line spool to the reel spool.

3. The reel stringer, according to claim 1, wherein the spool retainer permits the new line spool to rotate as the fishing line is pulled by the reel but prevents the new line spool from free-spinning to prevent the fishing line from tangling.

4. The reel stringer, according to claim 1, wherein an inside end of the shaft is coupled to the housing.

5. The reel stringer, according to claim 1, wherein the shaft is at least partially threaded at an outside end of the shaft such that the fastener is removably coupled to the shaft.

6. The reel stringer, according to claim 1, wherein the shaft is replaceable and available in a plurality of lengths to accommodate a supply spool of a plurality of sizes.

7. The reel stringer, according to claim 1, wherein the one or more flat washers press against one or both sides of the new line spool.

8. The reel stringer, according to claim 1, wherein the one or more flat washers reduce friction between the new line spool and the housing and/or between the new line spool and the one or more springs.

9. The reel stringer, according to claim 1, wherein the one or more springs press against a sides of the new line spool either directly or indirectly via the one or more flat washers such that the new line spool is prevented from free-spinning.

10. The reel stringer, according to claim 1, wherein the one or more springs located between the new line spool and the fastener, between the new line spool and the housing, or both.

11. The reel stringer, according to claim 1, wherein the fastener is removably coupled to an outside end of the shaft to prevent the new line spool, the one or more flat washers, and the one or more springs from falling off of the shaft.

12. The reel stringer, according to claim 1, wherein the reel is removably coupled to the reel holder to hold the reel in a position where the reel is cranked to draw the fishing line from the new line spool onto the reel spool.

13. The reel stringer, according to claim 1, wherein the reel seat mates with a reel foot of the reel in order to hold the reel to the reel holder.

14. The reel stringer, according to claim 1, wherein the reel holder is detachable from the housing.

15. The reel stringer, according to claim 1, wherein the stringer section is disposed in front of the housing.

16. The reel stringer, according to claim 1, wherein the stringer section houses the spool retainer and the one or more eyelets.

17. The reel stringer, according to claim 1, wherein the housing is made of a material selected from the group consisting of plastic, wood, aluminum, one or more composite resins, or an injection molded plastic.

18. The reel stringer, according to claim 1, wherein the first storage section is disposed behind the housing.

* * * * *